United States Patent [19]

Franco et al.

[11] 4,424,273

[45] Jan. 3, 1984

[54] SUBBING POLYESTER SUPPORT BASES AND PHOTOGRAPHIC FILM COMPRISING SAID IMPROVED SUPPORT BASES

[75] Inventors: Simone Franco; Alberto Valsecchi, both of Ferrania, Italy

[73] Assignee: Minnesota Mining and Manufacturing Company, St. Paul, Minn.

[21] Appl. No.: 378,767

[22] Filed: May 17, 1982

[30] Foreign Application Priority Data

May 26, 1981 [IT] Italy .............................. 48536 A/81

[51] Int. Cl.[3] .......................... G03C 1/78; G03C 1/96; B32B 27/06; B32B 27/36

[52] U.S. Cl. .................................... 430/529; 430/534; 430/535; 430/537; 428/483

[58] Field of Search ............... 430/529, 534, 535, 537; 428/483

[56] References Cited

U.S. PATENT DOCUMENTS 3,071,466 1/1963 Klockgether et al. .............. 430/535
3,148,986 9/1964 Ossenbrunner et al. ............ 430/534
3,615,552 10/1971 Danhauser et al. ................. 430/534
3,791,831 2/1974 von Bonin et al. ................. 430/529

*Primary Examiner*—Richard L. Schilling
*Attorney, Agent, or Firm*—Donald M. Sell; James A. Smith; Mark A. Litman

[57] ABSTRACT

The present invention relates to an improved photographic polyester support base coated with a first hydrophobic subbing layer and a second hydrophilic subbing layer, the improvement consisting of having said second subbing layer derived from a hardener containing, aqueous coating composition including (1) gelatin, (2) a vinyl addition polymer compound and (3) a low viscosity highly sulfonated water soluble polyacetal compound derived from the reaction of an aldehyde sulfonic acid compound with a polyvinyl alcohol compound, the relative quantities of said gelatin and vinyl addition polymer compound to the polyacetal compound being such as to provide good adhesion characteristics without any significant loss in antistatic properties.

10 Claims, No Drawings

SUBBING POLYESTER SUPPORT BASES AND PHOTOGRAPHIC FILM COMPRISING SAID IMPROVED SUPPORT BASES

TECHNICAL FIELD

The present invention relates to polyester support bases which are provided with a sub-layer, to processes for the preparation thereof and to light-sensitive photographic elements on said support bases.

BACKGROUND OF THE ART

The employment of a polyester film as a base for the coating of photographic layers is well-known, particularly for the production of photographic elements which require accurate physical characteristics. Polyester support bases, when compared to the more commonly used cellulose ester bases, are in fact dimensionally more stable and more resistant to the mechanical stresses under any employment conditions.

Since the adhesion of gelatin photographic layers directly coated onto the surface of the polyester bases is practically non existant, it is well known in the photographic art to coat two or more sub-layers between the polyester base and the gelatin photographic layers, viz. a first sub-layer called "primer", consisting of a hydrophobic polymer and a second sub-layer, called "subbing", consisting of a hydrophilic polymer, generally gelatin.

It is also known that the formation of static electric charges on the base is a serious problem in the production of photographic elements. While coating the light-sensitive photographic emulsion, the electric charges accumulated on the base discharge, producing light which is recorded as an image on the light sensitive layer. Other drawbacks, which result from the accumulation of electric charges on polymeric support bases, are the adherence of dust and dirt and coating defects.

The technique commonly used to solve such problems is the incorporation of ionic or hygroscopic conductive substances into the hydrophilic gelatin sub-layer of the polyester base. In order to achieve the desired effects from said substances, however, the humidity level inside the coating machines must be kept at least at a value of about 50–60%, at which level the gelatin sub-layer gets sticky thus causing a defect known in the art as "gel-pick-off" (in which small pieces of gelatin adhere to the transport rollers of the coating and drying machines during the production of the photographic element), which leaves the sub-layer full of holes which correspond to an underthickness in the light sensitive layer. Conductive polymeric layers to replace the sub-layer of the polyester base have also been studied, thus solving the problem of the storage of static charges. They, however, worsen the adhesion of the light-sensitive layer to the support base.

It is therefore highly desirable in the photographic art to provide a polyester support base with sublayers which assure good adhesion of the photographic layers to the base and avoid, as well, the storge of electrostatic charges on the support base itself.

SUMMARY OF THE INVENTION

Now, it has been found that a polyester support base (preferably a polyethylene terephthalate base biaxially stretched at high temperature), having coated thereon a first hydrophobic layer and a second hydrophilic layer, can be provided with good antistatic characteristics and good adherence with respect to photographic layers coated thereon (in particular gelatin photographic layers, such as for instance the light-sensitive silver halide layers, the gelatin interlayers, the backing layers having, e.g. an antihalo or anticurling function, and the protective layers for instance containing agents controlling the slipperiness or the reflecting power of the photographic material). These characteristics can be provided if said second layer is obtained by coating a gelatin-hardener containing water composition comprising (1) gelatin, (2) a vinyl addition polymer latex and (3) a low viscosity and highly sulfonated polyacetal obtained upon reaction of a low viscosity polyvinyl alcohol and a sulfonated aldehyde.

The subbing coating composition of the present invention is coated on the primer in quantities known in the art to obtain a layer of the desired thickness, generally less than one micron (the thickness of a subbing layer is one of its well-known general characteristics). The characteristics and relative quantities of the above (1) gelatin, (2) polymer and (3) polyacetal are important to control the adhesion and antistatic properties of the obtained layer.

As far as the hardener is concerned, its presence in the coating composition of the present invention has been found to be essential not only to prevent said hydrophilic sub-layer from dissolving in the photograhic baths, but also to obtain the desired adhesion properties, as described. It is believed that the hardener can be chosen among those well-known in the art as compounds capable of hardening the gelatin in the presence of said polyvinyl alcohol polyacetal compound (which compound may be hardened by certain compounds at rates higher than gelatin). Particularly useful were organic aldehyde hardener compounds, such as glutaraldehyde type compounds and active halogen containing hardener compounds, such as chlorinated triazine compounds. Such known hardeners are, as well-known, used to harden both gelatin and polyacetal present in the composition of the present invention, even if such hardeners are preferably used at coating pH-values near neutrality in order to favour the hardening of gelatin rather than polyacetal (acid pH-values are less preferred since they favour the hardening of polyacetal more than gelatin).

DETAILED DESCRIPTION OF THE INVENTION

In one aspect, the present invention relates to an improved photographic polyester support base coated with a first hydrophobic subbing layer and a second hydrophilic subbing layer, the improvement consisting of having said second hydrophilic layer derived from a hardener-containing, aqueous coating composition including gelatin, a vinyl addition polymer compound and low viscosity highly sulfonated water soluble polyacetal compound obtained by reaction of an aldehyde sulfonic acid compound with a low viscosity polyvinyl alcohol compound, the relative quantities of said gelatin and vinyl addition polymer with respect to the polyacetal compound being such as to provide good adhesion characteristics without any significant loss in the antistatic properties.

Particularly, the present invention relates to a subbed support base as said above in which the polyacetal has an intrinsic viscosity in the range of 0.2 to 0.8 dl/g, preferably in the range of 0.35 to 0.7 dl/g when measured in $NaNo_3$ 1M at 30° C. Still particularly, the present invention relates to a subbed support base as said above, in which the aldehyde sulfonic acid is a sulfonated aromatic aldehyde, preferably benzaldehyde-2,4-disulfonic acid, more preferably the sulfonated moieties in the polyacetal being in the range of 50 to 85 percent by weight, most preferably in the range of 60 to 75 percent by weight.

The present invention further refers to the above support base in which the vinyl addition polymer is polyethylacrylate.

More particularly, the present invention refers to a support base, as above described, in which the hardener is chosen to assure hardening of the gelatin sufficient to provide proper adhesion characteristics without loss of antistatic properties, such hardener preferably being chosen within the class of organic aldehyde and active halogen including hardener compounds, more preferably glutaraldehyde and chlorinated triazine compounds as described, most preferably glutaraldehyde.

More preferably, the present invention relates to a support base as said above, in which the gelatin is present in an amount of 20 to 60 percent, most preferably of 30 to 40 percent by weight with respect to the polyacetal, the vinyl addition polymer is present in an amount of 5 to 60 percent, most preferably of 40 to 50 percent by weight with respect to the polyacetal.

The polyacetal quantity is chosen as to obtain a subbing layer of the desired thickness characteristics, as indicated. Normal quantities range between 0.025 and 0.2 grams per square meter of coated layer, preferably between 0.05 and 0.1 gram per square meter.

In a particular aspect the present invention relates to the improved photographic polyester support base coated with a first hydrophobic subbing layer and a second hydrophilic subbing layer, the improvement consisting of having said second hydrophilic layer derived from a hardener containing aqueous composition including the polyacetal compound of lower viscosity values in the preferred range, such as 0.2 to 0.5, and/or the vinyl addition polymer in lower quantities within the preferred range, such as 5 to 15 percent by weight with respect to the polyacetal, and or gelatin in higher quantities within the preferred range, such as 40 to 60 percent by weight with respect to the polyacetal.

According to another aspect, the present invention relates to a light-sensitive photographic film comprising the improved support base of the present invention, having coated thereon a plurality of photographic layers including a photosensitive silver halide gelatin layer and an auxiliary gelatin layer.

According to a further aspect, the present invention refers to a process for the production of a subbed support base suitable for coating with a gelatinous photographic composition, which comprises coating at least one surface of a biaxially oriented and heat-set primed polyethylene terephthalate film with a composition substantially consisting of an aqueous solution of a low viscosity highly sulfonated polyacetal of a low viscosity polyvinyl alcohol and an aldehyde sulfonic acid, gelatin, a latex of a vinyl addition polymer and a hardener of said gelatin and polyacetal, as described, wherein the ratios of gelatin and vinyl addition polymer to the polyacetal are selected as defined above to obtain the adhesion of the photographic layers coated thereon and to reduce significantly the surface resistivity of the subbed base.

The polyacetal compounds of the present invention can be prepared according to known methods. The preparation is carried out in aqueous or methanol solution with the addition of mineral acids as acetalization catalysts, preferably at temperatures between 50° C. and 80° C. The aldehyde sulfonic acids used to prepare the polymer acetals of the present invention can be aliphatic or aromatic. Examples of aliphatic sulfonic acids are butyraldehyde sulfonic acid, acetaldehyde sulfonic acid and propionaldehyde sulfonic acid. The following are examples of suitable aromatic aldehyde sulfonic acids: benzaldehyde-2-sulfonic acid, benzaldehyde-4-sulfonic acid, benzaldehyde-2,4-disulfonic acid and substituted aldehyde sulfonic acids, such as 4-chloro-benzaldehyde-2-sulfonic acid, 5-nitro-benzaldehyde-2-sulfonic acid, 2,6-dichloro-benzaldehyde-3-sulfonic acid and 3-methyl-benzaldehyde-2-sulfonic acid. It has been found that the aldehyde sulfonic acids are preferably highly sulfonated aromatic aldehydes, more preferably benzaldehyde-2,4-disulfonic acid. Suitable polyvinyl alcohols are characterized by a low intrinsic viscosity, that is, lower than about 1.5, preferably comprised between 0.4 and 1.2, and more preferably between 0.4 and 0.6. The vinylacetate content preferably is less than 5 percent, and more preferably equal to or less than 2 percent. The polyacetal of the present invention are highly sulfonated, i.e. they include sulfonated moieties in the quantity of at least 50 percent by weight (of the polyacetal), preferably between 50 and 85 percent by weight, more preferably between 60 and 75 percent by weight. The polyacetals obtained upon acetalization with sulfonated aldehyde of said low viscosity polyvinyl alcohols are characterized by low intrinsic viscosities, i.e. lower than about 1, preferably comprised between 0.2 and 0.8, more preferably between 0.35 and 0.7. According to the experiments of the Applicant, it has been found that polyacetals having fewer sulfonated moieties than the preferred range do not decrease the surface resistivity sufficiently so as to avoid the storage of electric charges in most circumstances and polyacetals having more sulfonated moieties than the preferred range cause the adhesion between the photographic layers and the subbed film to be inadequate to withstand the handling conditions to which photographic films are subjected. Polyvinylacetals having intrinsic viscosities exceeding the described range, particularly the upper limit in the range, cause significant loss of adhesion. On the contrary, polyvinylacetals having lower intrinsic viscosity values in the preferred range, for example between 0.2 and 0.5 ensured a better adhesion.

In the subbed support base of the present invention, it has been found that proportions of gelatin and vinyl addition polymer (calculated with respect to the polyacetal compound) are critical in providing satisfactory adhesion to photographic layers coated thereon. It has been found that proportions of gelatin, preferably in the range of 20 to 60 percent, more preferably in the range of 30 to 40 percent by weight with respect to the polyacetal compound provide optimum adhesion to conventional photographic gelatin layers, larger proportions increasing the surface resistivity at values similar to those obtained with gelatin alone, and too small proportions, e.g. lower than 10 percent, causing however an adhesion loss similar to that observed when no gelatin is present. The vinyl addition polymers useful in the present invention are obtained upon emulsion polymerization of suitable monomers or combinations of monomers known in the art: the acrylic or methacrylic acid ester type monomers, such as ethylacrylate, methylmethacrylate, methylacrylate, 1-butylacrylate, etc.; alkyl-substituted acrylamides, such an N,N-dibutylacrylamide, N-ethylacrylamide, etc.; diene monomers, such as butadiene, isoprene, dimethyl-butadiene, chloroprene, etc.; aromatic monomer compounds such as styrene, vinyltoluene, etc.; acrylonitrile, methacrylonitrile, vinylpyridine, vinylquinoline and other similar, commonly known monomers. Such polymers are present in the subbing composition dispersed in the form of very small particles having dimensions ranging from 0.03 to 0.4 microns, more preferably from 0.04 to 0.1 microns. Such water dispersions (latices) are usually prepared by dispersing one or more of the above described monomers in water in the presence of one or more anionic dispersing or surfactant agents of the type used in photography (such as for instance dioctylsodiumsulfosuccinate, sodium laurylsulfate, sodium alkylnaphthalensulfonate, and others described in Schwarty et al., *Surface Active Agents And Detergents,* vol. I and II, Interscience Publishers and in U.S. Pat. Nos. 2,922,108; 3,068,101; 3,201,252; 3,165,409; in FR patents Nos. 1,566,240 and 1,497,930 and in GB patents 580,504 and 985,483) or, in particular cases when it is necessary, cationic or nonionic dispersing agents (of the type described for instance in GB patent No. 1,274,523 and in U.S. Pat. Nos. 3,762,025 and 3,860,425), and performing polymerization by employing a water-soluble initiator which generally is a per-compound (ammonium or potassium persulfate, hydrogen peroxide, sodium perborate, etc.), or a redox system (such as persulfate-bisulfite), or a compound of the $\alpha,\alpha'$-azobisisobutyramidine type and 4,4'-azobiscyanpentanoic acid type (U.S. Pat. Nos. 2,739,137; 2,599,900 and in GB patent No. 759,409).

Preferably, for the purposes of the present invention, the vinyl addition polymers have a glass transition temperature lower than 20° C. (the term glass transition referring to the characteristic change in the polymer properties from those of a relatively hard, brittle, glassy material to those of a softer, more flexible substance like rubber, when the temperature is raised through the glass transition temperature), the preferred polymers being the acrylic and methacrylic acid ester polymers chosen within the class of polymethylacrylate, polyethylacrylate, polybutylacrylate, polyethoxyethylacrylate, polyhexylacrylate, polyethylhexylacrylate, polybutylmethacrylate and polyethoxyethylmethacrylate, the most preferred being polyethylacrylate. It has been found that preferred vinyl addition polymer proportions are in the range of at least 20 to 60 percent, more preferably in the range of 40 to 50 percent by weight with respect to the polyacetal compound, smaller proportions resulting in weaker adhesion and larger proportions having negative effects on the layer properties. When polyacetal compounds having lower viscosity values in the preferred range are used, it has been found that vinyl addition polymer proportions of about 5 to 15 percent by weight with respect to the acetal compound can still ensure good adhesion properties. That can be useful to improve the coil alignment of subbed support bases wound up on a core in long rolls (for example 2,000 meter rolls). In this case, polyacetal compounds of lower viscosity in the described range allow the use of lower proportions of vinyl addition polymer without substantially affecting the adhesion of the photographic layers to the support base. The above is particularly true when the coating composition of the present invention includes the appropriate proportions of water insoluble soft or hard matting agents (such as PMMA and/or $SiO_2$) as known in the art, as for example described in U.S. Pat. No. 3,411,907. To compensate the partial loss of adhesion connected with the use of lower quantities of vinyl addition polymer compound, higher gelatin quantities within the preferred range can be used, such as 40 to 60 percent of gelatin with respect to the polyacetal compound.

The aqueous subbing composition coated on the primed polyethylenterephthalate support base and dried is subject, according to the purposes of the present invention, to crosslinking in the presence of a hardener. The quantity of the hardener is not per se critical and will vary according to the proportions of the ingredients of the subbing composition, but should be sufficient to insolubilize the subbing composition. Quantities of the hardener in the range of 1 to 30 percent, preferably of 5 to 10 percent by weight with respect to the weight of the whole subbing composition (including all the solid ingredients with the exclusion of water) are generally useful according to the present invention.

The presence of a hardener proved to be significant not only with regard to insolubilizing the layer but also in assuring its adhesion characteristics. To this purpose, among the hardeners known to the man skilled in the art to harden gelatin and/or hydroxy group containing polymers, particularly useful to the purposes of the present invention proved to be those of the class of organic dialdehydes, e.g. succinaldehyde and glutaraldehyde, the preferred compound being glutaraldehyde, and those of the class of chlorinated triazine hardeners, such as 2,4,6-trichloro-triazine and its hydrolisis derivatives such as monohydroxy-dichloro-triazine and dihydroxy-monochloro-triazine (the dihydroxy being weaker as hardener than monohydroxy, as described in U.S. Pat. No. 3,325,287) and alkali salts thereof.

The man skilled in the art can also examine other hardeners to find one or more compounds suitable to the coating conditions of his own materials. He can vary the nature and the quantity of the hardening compound(s), but has to monitor the adhesion properties of his own material and the solubility of the layer in the photographic processing. To this purpose, it may be useful to consider the effect of the hardening or coating pH-values as indicated hereinbefore.

Conventional additives such as slip, antiblock, preservative and matting agents may be included in the subbing composition of the present invention in small amounts without affecting the surface resistivity of the subbed film and the adhesion of photographic layers. The procedure for applying the subbing composition may be one of the known coating techniques, such as dip coating, bead coating, reverse roller coating, airknife coating, curtain coating and the like.

It is preferred that the dried subbing layer has a thickness in the range of 0.1 to 5.0 micron, most preferably in the range of 0.5 to 1.0 micron for optimum adhesion to the photographic layers and antistatic properties, such as thickness being accomplished by well-known appropriate modifications to the concentration of the subbing composition and/or the conditions of coating.

The polyester support bases used in the present invention are the bases which are manufactured from aliphatic diols and aromatic dicarboxylic acids, preferably they are polyethyleneterephthalate bases. They are preferably obtained upon extrusion of the polyester molten mass, without the aid of solvents or plasticizers, onto a metallic polished surface to form a substantially amorphous unoriented film; the film is then stretched in the two perpendicular directions from about 2.5 to 4 times the unit width and length at a temperature near the film softening temperature so as to obtain the desired physical characteristics. The polyester bases can be transparent or, if necessary, can contain photographically inert dyes, for instance blue dyes for X-ray films.

As already said, the first sub-layer coated on the surface of the polyester support base, called "primer", consists of a hydrophobic polymer; suitable hydrophobic polymers have been described in many patents (see e.g. GB patents Nos. 688,528; 1,125,460; 1,140,651 and 1,146,215; U.S. Pat. Nos. 3,271,345 and 2,943,937; FR patent No. 1,283,764 and IT patent No. 490,247), the most suitable hydrophobic polymer being methylacrylate-itaconic acid-vinylidene chloride terpolymer, described in IT patent No. 490,247.

Any suitable light-sensitive photographic emulsion, such as conventional gelatin silver halide emulsion for X-ray and graphic art films, and any suitable light-insensitive auxiliary photographic compositions, such as conventional gelatin antihalo compositions including soluble dyes, may be applied by conventional techniques directly onto the subbing layer; such emulsions and compositions may contain any conventional additives.

The following examples, which further illustrate the present invention, report some experimental data obtained from processes and measurements which are of normal use in the art. As far as the electric resistivity is in particular concerned, samples of the subbed support base were kept in a cell at 21° C. and 50% R.H. for 24 hours and the electric resistivity was measured by means of a Meghometer type 24-23 (Brual and Kyaer). The following examples also report three adherence values: the first is the dry adherence value and refers to the adherence of the silver halide emulsion layers and of the auxiliary photographic gelatin layers to the polyethylene terephthalate base prior to the photographic processing; the second one is the wet adherence value and refers to the adherence of the above reported layers to the base during the photographic processing and the third one is the dry adherence value and refers to the adherence of the above reported layers to the base after the photographic processing. In particular, the dry adherence was measured by tearing samples of the film, applying a 3M Scotch ® brand 5959 Pressure Sensitive Tape adhesive tape along the tear line of the film and separating rapidly the tape from the film; the layer adherence was evaluated according to a scholastic method by giving a value of 2 when the whole layer was removed from the base and a value of 8 when no part thereof was removed from the base and intermediate values for intermediate situations. The wet adherence was measured by drawing some lines with a pencil point to form an asterisk on the film just taken out from the processing bath and by rubbing on the lines with a finger. Also in this case the adherence of the layers was evaluated according to scholastic method by giving a value of 2 when the layers were totally removed from the base, a value of 8 when no portion thereof was removed and intermediate values for intermediate cases.

EXAMPLE 1

985 g of polyvinyl alcohol (98% hydrolisis and $[\eta]=0.58$ dl/g in $H_2O$ at 25° C.) dissolved in 7 liters of water were added with 1570 g of benzaldehyde-2,4-disulfonic acid sodium salt and 51 ml of 98% $H_2SO_4$; the solution was then heated at 70° C. for 2 hours. After cooling, the polymer was separated by pouring the obtained solution into ethanol under stirring; then it was washed with ethanol and dried. The yield was 2300 g of a water soluble polymer having $\%S=12.15$ corresponding to a content of 72% w/w of vinylbenzal-2,4-disulfonic acid sodium salt moieties. The viscosity was $[\eta]=0.7$ dl/g in $NaNO_3$ 1 M at 30° C. The above was polymer No. 1 (P. No. 1).

EXAMPLE 2

Following a procedure similar to that of example 1, the content of vinylbenzal-2,4-disulfonic acid sodium salt moieties was changed within a wide range simply by changing the ratio of polyvinyl alcohol/benzaldehyde-2,4-disulfonic acid sodium salt and/or the reaction time. Polyvinyl alcohols of different intrinsic viscosities were used, thus obtaining benzalsulfonate derivative polymers of different viscosities. The following table reports the viscosities and the percentage of sulfonated moieties.

TABLE 1

| Polymer no. (P. no.) | $[\eta]$ of starting PVA | Sulfonated moiety percentage | $[\eta]$ of sulfonated polymers |
|---|---|---|---|
| 2 | 0.58 | 53% | 0.57 |
| 3 | 0.58 | 40% | — |
| 4 | 0.58 | 62% | — |
| 5 | 0.41 | 48% | 0.4 |
| 6 | 0.41 | 66% | 0.4 |
| 7 | 1.0 | 51% | 1.1 |
| 8 | 1.0 | 68% | 1.1 |
| 9 | 1.2 | 47% | 1.3 |
| 10 | 1.2 | 65% | 1.48 |
| 11 | 0.41 | 50.5% | 0.38 |
| 12 | 0.41 | 68% | 0.39 |
| 13 | 0.41 | 88% | — |

EXAMPLE 3

The subbing compositions of each coating were prepared dissolving the ingredients in quantities shown in Table 2 in 1000 ml of water at 40° C. A polyethylenterephthalate film was melt extruded and quenched to the amorphous state on a cooled rotating drum. The resulting film was stretched in the direction of extrusion to about 3.0 times its original length. It was then coated on one side with a primer composition consisting of a latex of the terpolymer (vinylidene chloride-itaconic acid-methylacrylate). The dried coated film was then stretched sideways about 3.0 times its original width and finally heat-set at a temperature of about 220° C. In each coating the subbing composition at pH=7 was applied by air-knife technique on the above film at a polyacetal coverage of 0.075 g/m² and the coated film was dried at 95° C. A conventional aqueous gelatin silver halide emulsion for X-ray film and a conventional aqueous gelatin antihalo composition were applied respectively to different portions of the subbed film of each coating. The surface resistivity of the subbed film and the dry and wet adhesion between the emulsion layers or the antihalo layer and the subbing layer were measured by the procedures described above. The resulting data are shown in Table 2.

TABLE 2

| Coating | Ingredients in 1,000 ml of subbing compos. Polymer no. 1 (g) | Gelatin (g) | Polyethylacrylate (g) | Glutaraldehyde (g) | Surface resistivity (Ohms) | Adhesion between the subbing layer and X-ray emulsion layer: 20 days shelf ageing | X-ray emulsion layer: 15 h 50° C. 65% R.H. | Antihalo layer: 20 days shelf ageing | Antihalo layer: 15 h 50° C. 65% R.H. |
|---|---|---|---|---|---|---|---|---|---|
| 3 | 3 | — | — | 0.15 | $7.10^{8}$ | 8-2-8 | 8-4-8 | 4-4-4 | 4-4-4 |
| 4 | 3 | 0.55 | — | 0.15 | $2.10^{9}$ | 8-3-8 | 8-4-8 | 4-4-6 | 6-8-5 |
| 5 | 3 | 1.1 | — | 0.15 | $2.10^{10}$ | 8-4-8 | 8-4-8 | 4-7-6 | 7-6-4 |
| 6 | 3 | — | 0.7 | 0.15 | $1.10^{9}$ | 8-4-8 | 8-5-8 | 7-5-7 | 7-6-7 |
| 7 | 3 | 1.1 | 0.7 | 0.15 | $1.10^{10}$ | 8-5-8 | 8-6-8 | 7-6-7 | 7-6-7 |
| 8 | 6 | 2.2 | 2.8 | 0.36 | $9.10^{9}$ | 8-6-8 | 8-7-8 | 7-6-7 | 7-7-7 |

EXAMPLE 4

Following the procedure described in Example 3, subbed films were prepared with subbing compositions prepared by dissolving in 1,000 ml of water at 40° C. the ingredients in the quantities shown in Table 3. The subbed films of each coating were coated with conventional gelatin silver halide emulsion. The dry and wet adhesion between the emulsion layers and the subbing layers was measured following the procedures described above. The obtained data are reported in the following Table.

TABLE 3

| Coating | Ingredients in 1,000 ml of subbing composition: Polymer and quantity no. | Polymer and quantity (g) | Gelatin (g) | Polyethylacrylate (g) | Glutaraldehyde (g) | Adhesion: 20 days shelf ag. | Adhesion: 15 h 50° C. 65% R.H. |
|---|---|---|---|---|---|---|---|
| 9 | 1 | 6 | 2.4 | 2.8 | 0.3 | 8-6-8 | 8-7-8 |
| 10 | 6 | 6 | 2.4 | 2.8 | 0.3 • | 8-8-8 | 8-8-8 |
| 11 | 8 | 6 | 2.4 | 2.8 | 0.3 | 8-4-8 | 8-4-8 |
| 12 | 10 | 6 | 2.4 | 2.8 | 0.3 | 8-4-8 | 8-5-8 |
| 13 | 12 | 6 | 2.4 | 2.8 | 0.3 | 8-7-8 | 8-8-8 |

EXAMPLE 5

Following the procedure described in Example 3, subbed films were prepared by dissolving in 1,000 ml of water at 40° C. the ingredients in the quantities shown in Table 4; the subbed films of each coating were coated with a conventional X-ray gelatin silver halide emulsion. The adhesion between the emulsion layers and the subbing layers was measured by procedures described above. The obtained data are reported in the following Table.

TABLE 4

| Coating | Ingredients in 1,000 ml. of subbing compos.: Polymer no. | Quantity (g) | Gelatin (g) | Polyethylacrylate (g) | Glutaraldehyde (g) | Adhesion: 20 days shelf ag. | Adhesion: 15 h 50° C. 65% R.H. |
|---|---|---|---|---|---|---|---|
| 14 | 1 | 6 | 2.4 | 2.8 | 0.3 | 8-6-8 | 8-7-8 |
| 15 | 2 | 6 | 2.4 | 2.8 | 0.3 | 8-4-8 | 8-6-8 |
| 16 | 5 | 6 | 2.4 | 2.8 | 0.3 | 8-2-8 | 8-4-8 |
| 17 | 6 | 6 | 2.4 | 2.8 | 0.3 | 8-8-8 | 8-8-8 |
| 18 | 7 | 6 | 2.4 | 2.8 | 0.3 | 8-2-8 | 8-4-8 |
| 19 | 8 | 6 | 2.4 | 2.8 | 0.3 | 8-2-8 | 8-4-8 |
| 20 | 9 | 6 | 2.4 | 2.8 | 0.3 | 8-4-8 | 8-5-8 |
| 21 | 10 | 6 | 2.4 | 2.8 | 0.3 | 8-4-8 | 8-4-8 |
| 22 | 11 | 6 | 2.4 | 2.8 | 0.3 | 8-2-8 | 8-4-8 |
| 23 | 12 | 6 | 2.4 | 2.8 | 0.3 | 8-7-8 | 8-8-8 |

EXAMPLE 6

Following the procedure described in Example 3, subbed films were prepared by dissolving in 1,000 ml of water at 40° C. the ingredients shown in Table 5. A conventional aqueous gelatin silver halide emulsion for X-ray films and a conventional aqueous gelatin antihalo composition were applied respectively to different portions of the subbed film. The surface resistivity of the subbed film, the dry and wet adhesion between the emulsion layers and the antihalo layer and the subbing layer, as well as the maximum length wound up and coil alignment were evaluated by the procedures described above. The obtained results are reported in Table 5.

TABLE 5

| Coating | Ingredients in 1,000 ml. sub. comp.: P.no/g | Gelatin (g) | PEA (g) | DMU + RA (g + g) | PMMA $\phi = 0.5\mu$ (g) | Surface resistivity Ohms | Adhesion between subbing layer and X-ray em. layer: 20 days shelf ag. | X-ray em. layer: 15 h 50° C. 65% R.H. | Antihalo layer: 20 days shelf ag. | Antihalo layer: 15 h 50° C. 65% R.H. | maximum film length wound up on the core (m.) | Coil alignement |
|---|---|---|---|---|---|---|---|---|---|---|---|---|
| 24 | 1/6 | 2.2 | 1.45 | 0.2 + 0.1 | — | $3.10^{9}$ | 8-8-8 | 8-8-8 | 7-7.5-7 | 7-7.5-7.5 | 1,783 | poor |
| 25 | 12/6 | 3 | 0.6 | 0.1 + 0.05 | 0.15 | $5.10^{9}$ | 8-8-8 | 8-8-8 | 7-6-7 | 5.5-7-6 | >2,000 | very good |

PEA = Polyethylacrylate
DMU = dimethylolurea
RA = Resorcinaldehyde
PMMA = Polymethylacrylate

We claim:

1. A polyester support base coated with a first hydrophobic subbing layer and a second hydrophilic subbing layer for further coating with photographic layers, characterized by the fact that said second subbing layer is a hardened aqueous coating composition comprising (1) gelatin, (2) a vinyl addition polymer compound and (3) a low viscosity highly sulfonated water soluble polyacetal compound having at least 50% by weight of the polyacetal as sulfonated moieties, said compound derived from the reaction of an aldehyde sulfonic acid compound with a low viscosity polyvinyl alcohol compound having a viscosity of less than 1.5 dl/g, the relative quantities of said gelatin and vinyl addition polymer compound with respect to the polyacetal compound being such as to provide good adhesion characteristics without any significant loss in antistatic properties.

2. A subbed support base according to claim 1, wherein the aldehyde sulfonic acid is benzaldehyde-2,4-disulfonic acid.

3. A subbed support base according to claim 1, in which the sulfonated moieties of the polyacetal are present in the range of 50 to 85 percent by weight.

4. A subbed support base according to claim 1, in which the polyacetal compound has an intrinsic viscosity in the range of 0.2 to 0.8 dl/g.

5. A subbed support base according to claim 1, in which the vinyl addition polymer compound is polyethylacrylate.

6. A subbed support base according to claim 1, wherein the composition is hardened with glutaraldehyde.

7. A subbed support base according to claim 1, wherein the composition is hardened with a chlorinated triazine compound.

8. A subbed support base according to claim 1, wherein the gelatin is present in an amount of 20 to 60 percent by weight with respect to the polyacetal compound.

9. A subbed support base according to claim 1, wherein the vinyl addition polymer compound is present in an amount of 10 to 60 percent by weight with respect to the polyacetal compound.

10. A light-sensitive photographic film comprising a subbed support base according to any preceding claim and at least one photographic layer coated directly onto said subbing layer.

* * * * *